United States Patent [19]
Dupont et al.

[11] Patent Number: 5,907,645
[45] Date of Patent: May 25, 1999

[54] LIQUID CRYSTAL FERROELECTRIC ELECTRO-OPTICAL PHASE MODULATORS WHICH ARE INSENSITIVE TO POLARIZATION

[75] Inventors: Laurent Dupont, Plouzane; Jean-Louis de Bougrenet de la Tocnaye, Le Conquet; Michel Monerie, Ploulec'h, all of France

[73] Assignee: France Telecom, Paris, France

[21] Appl. No.: 08/772,605

[22] Filed: Dec. 23, 1996

[30] Foreign Application Priority Data

Jan. 8, 1996 [FR] France ................... 96 00284

[51] Int. Cl.$^6$ ........................................ G02F 1/035
[52] U.S. Cl. .................. 385/3; 385/2; 385/1; 385/15; 349/133; 349/172; 349/196
[58] Field of Search ...................... 385/3, 1, 2, 4, 385/5, 8–14, 15, 16; 349/172, 196, 133, 22, 21, 123, 183

[56] References Cited

U.S. PATENT DOCUMENTS 4,995,705  2/1991  Yoshinaga et al. ................. 349/22
5,151,808  9/1992  Yamazaki et al. ................. 349/133

FOREIGN PATENT DOCUMENTS 2 701 571  8/1994  France .

OTHER PUBLICATIONS

Copy of Rapport DE Recherche Preliminaire. Oct. 4, 1996.
M.J. O'Callagham, et al, 2412 Optics Letter 16 (1991) May 15, No. 10, New York, NY, US; Diffractive ferroelectric liquid–crystal shutters for unpolarized light; pp. 770–772.
S.P. Fang, et al., 2412 Optics Letters 19 (1994) Aug. 15, No. 16, Washington, US; High–performance single–mode fiber–optic switch; pp. 1204–1206.
Patent Abstracts of Japan; Kawachi, Masao, Publication No. JP57027234, Publication Date, Feb. 13, 1982; Application No. JP800102446; Application Date Jul. 7, 1980; 1 page.

*Primary Examiner*—Phan T. H. Palmer
*Attorney, Agent, or Firm*—Laff, Whitesel, Conte & Saret, Ltd.

[57] ABSTRACT

The modulator is formed by a smectic chiral ferroelectric C* liquid crystal cell (CL), crossed by the light signal which is transmitted by the said fibre. The cell (CL) is provided with transparent walls and transparent command electrodes (5 to 7). The liquid crystal (CL), used in half-wave mode, is of the SSFLC (surface stabilized ferroelectric liquid crystal) type, having a wide tile angle θ, which is as close as possible to 45°, in such a way that the said modulator is insensitive to polarisation. The modulator may be connected to two parallel fibres (A2, A3; B2, B3), pertaining to the intermediary part of a Mach-Zehnder coupler between the two 3 dB couplers, and when it is provided in order to modulate the light signal transmitted by either one of the two fibres.

6 Claims, 4 Drawing Sheets

LIQUID CRYSTAL FERROELECTRIC ELECTRO-OPTICAL PHASE MODULATORS WHICH ARE INSENSITIVE TO POLARIZATION

FIELD OF THE INVENTION

The present invention relates to liquid crystal ferroelectric electro-optical phase-modulators which are insensitive to polarisation, intended for use with single mode optical fibres, singlecore or multi-core, and, more particularly, in Mach-Zehnder directional couplers and Mach-Zehnder interferometers.

BACKGROUND OF THE INVENTION

A Mach-Zehnder directional coupler, such as that shown in FIG. 1 of this application, comprises two identical single mode guide elements, A and B, and comprises two couplers. The first coupler C1, on the left, has a length $\Lambda/4$, where $\Lambda$ is the coupling period, and produces the transfer effect towards the guide element B of half the optical power which has entered the guide A. In guide B, at the output of coupler C1, the light wave leads in phase of $\pi/2$. At the other end, the second coupler C2, has an identical length, and is capable of providing either the transfer to the guide B of the second half of the light if the phase at the input of the coupler C2 is still leading in phase $\pi/2$ at the input of the coupler C2, coupler C2 returns the light from guide B to guide A if the phase lags by $\pi/2$. The function of the switching unit from one channel to the other is ensured by means of an electro-optical phase modulator M.

By way of information, with regard to Mach-Zehnder couplers, reference may be made to the technical study "Fibre-optic systems" by P. Halley, published by Eyrolles in 1985, page 143.

In the technical study "Transmissions by fibre optics", by Y. Suematsu et al., published by Masson in 1984, pages 110 and 111, there is likewise a disclosure and description of an optical switching device consisting of two phase modulators, operating respectively on each branch of a Mach-Zehnder coupler.

An initial object of the present invention includes providing, as the electro-optical modulator in a Mach-Zehnder coupler, a liquid crystal ferroelectric electro-optical coupler which engenders bi-refractivity modulation by the rotation of the optical axis, and which allows for phase modulation, which is adapted to the function principles of a Mach-Zehnder coupler.

By way of further information, both the principle and the obtaining of an index modulation, or of a binary or analog phase in a ferroelectric liquid crystal, have been described in the technical article "Programmable phase-only optical device based on ferroelectric liquid crystal SLM" by S. E. Broomfield et al., which appeared in the British publication Electronics Letters Jan. 2, 1982, Vol. 28, pp. 26–23, and in the technical article "High speed analog refractive index modulator that uses a chiral smectic liquid crystal", by A. Sneh et al., which appeared in the American Journal Optics Letters of Feb. 15, 1994, Vol. 19. No. 4, pp. 305–307.

In relation to other electro-optical modulators, liquid crystal modulators are interesting solutions due to the fact that substantial electro-optical effects are obtained under a weak electrical field, and at low cost. With smectic liquid crystals, it is possible to achieve practical switching times of a few tens of microseconds. Among the smectic liquid crystals which allow for binary phase modulation and which can be controlled almost perfectly, C* smectics are the best suited for the application envisaged according to the invention, for allowing for modulation $(0, \pi)$. A second quality relates to the insensitivity to polarisation. More precisely, the electro-optical modulator must be insensitive simultaneously to the state and to the orientation of the polarisation, to the extent that it is no longer possible to control the state of input polarisation of the Mach-Zehnder coupler, or at least to control its orientation.

By way of still further information, different solutions have already been described and proposed to overcome this disadvantage, in this context. For example, reference is made to the document WO-A-94 25893 and to the technical article "Polarisation-insensitive operation of ferroelectric liquid crystal devices", by S. T. Warr et al., which appeared in the British journal Electronics Letters of Mar. 6, 1995, Vol. 31, No. 9, pp. 714–716.

In addition to this interest has been shown in the use of a liquid crystal at a broad tile angle $\theta$, close on 45°, and operating in half-wave to provide binary phase converters, with a minimum of losses and insensitive to polarisation.

This type of component appears to be extremely well-suited for providing an electro-optical phase modulator which can be used in a directional Mach-Zehnder coupler.

According to the invention, it is proposed to make use of an SSFLC (surface stabilized ferroelectric liquid crystal) cell in an electro-optical phase modulator, such as a liquid crystal, the particular feature of which is the provision of a wide tilt angle $\theta$ which should be as close as possible to 45°.

FIG. 2 shows a schematic representation of the known principles of operation of a traditional SSFLC cell. The cell CL has perpendicular layers at the walls P1 and P2, constituted by two large rectangular surfaces. The thickness of the cell CL is the distance between the two walls P1 and P2, and is selected to be equal to $\Lambda/2$; i.e. this is a half-wave cell. The cell CL and the transparent walls P1 and P2 are assumed to transmit a light bundle Z, the incident wave level of which is symbolically represented in front of the cell CL by its electromagnetic field vectors E and H. The transparent walls P1 and P2 are electrical conductors and can be submitted to a difference in electrical potential +E, indicated by an arrow tail or –E, indicated by an arrow head.

With a cell CL in which the tilt angle $\theta$ is close to 45°, for a difference in potential of +E, which corresponds to the state E1, representing in schematic form the orientation of the molecules, and for a difference in potential –E, which corresponds to the status E2, representing schematically the switched orientation of the molecules, it can be seen that, between the state E1 and the state E2 the orientation of the molecules has turned through $\pi/2$. On the right in FIG. 2, the state E1 is symbolically represented by an ellipse, the main axis of which carriers the vector $n_e$ (extraordinary index), and the lesser axis of which bears the vector $n_o$ (ordinary index).

By way of example given that $\Delta n=0.12$ for $\Lambda=546$ mm, and that $\Delta n=0.1$ for $\Lambda 1550$ nm, a thickness of the cell can be derived in the order of 7 $\mu$m in order to obtain a half-wave. The response time is 126 $\mu$s for a voltage of 10 V/$\mu$m at a temperature of 25° C., and the spontaneous polarisation is 72 nC/cm2. It may be noted that, for a voltage of 20 V/$\mu$m, the response time would be 60 $\mu$s.

In the principle diagram in FIG. 2, it can be seen that the optical axis of the liquid crystal rotates through 90° if $\theta$ is equal to 45°, by changing the sign of the electrical field applied, E. When the thickness of the liquid crystal is a half-wave, a phase variation is obtained which is equal to $\pi$ between the two individual axes, whatever the state of polarisation might be.

Assume a state of rectilinear polarisation of any orientation at all. A transition to a state of any elliptical polarisation will exert no change in the principle of phase modulation in the context of rectilinear polarisation when the anisotropic phase displacement $\phi$ is equal to $\pi$ and $\theta$ is equal to 45°.

$$J_{\theta,\phi} = \begin{pmatrix} \cos^2 s\theta \exp\left(-i\frac{\phi}{2}\right) + \sin^2 s\theta \exp\left(+i\frac{\phi}{2}\right) & -i\sin 2s\theta \sin\frac{\phi}{2} \\ -i\sin 2s\theta \sin\frac{\phi}{2} & \cos^2 s\theta \exp\left(+i\frac{\phi}{2}\right) + \sin^2 s\theta \exp\left(-i\frac{\phi}{2}\right) \end{pmatrix}$$

where $\theta$ is the tile angle, s is a function of the position of the neutral axes in relation to the vertical polarisation Pv and $\phi = 2\pi e/\Lambda(n_s + n_o)$ is the anisotropic phase-displacement where. The constant phase displacement $\phi$ is $= \pi e/\Lambda(n_\phi + n_o)$ has been ignored.

In the situation in which $\phi = \pi$ and if the input polarisation Pi is vertical, the output polarisation Ps is:

Ps = −i(cos 2sθPv + sin 2sθ Ps)

If $\theta = 45°$ is chosen, in the situation in which s = 2", corresponding to the state E1 of the liquid crystal:

Ps1 = −i(cos 4αθ Pv + sin 4αθ Ps)

and in the situation in which s = 2(−1), corresponding to the second state of the liquid crystal, designated E2;

Ps2 = +i(cos 4αθ Pv + sin 4αθ Ps)

The relationships indicated above illustrate the method for obtaining two identical states of polarisation at the output, but phase-displaced between one another by $\pi$.

Such conditions are fulfilled, for example, by using the material CS-2005 from Chisso for the SSFLC cells, and by adjusting the thickness of the cell in order to obtain a half-wave at the operational wavelength of the coupler.

SUMMARY OF THE INVENTION

According to one characteristic of the present invention, an electro-optical phase modulator is provided for single mode optical fibres, formed by a smectic chiral ferroelectric C* liquid crystal which is crossed by the light signal transmitted by the optical fibre. The cell is provided with transparent walls and transparent command electrodes. The liquid crystal used in half-wave mode, is of the SSFLC (surface stabilized ferroelectric liquid crystal), having a wide tilt angle $\theta$ which is as close as possible to 45°. The modulator is used in such a way that it is insensitive to polarisation.

According to another characteristic, the modulator is coupled to two parallel fibres pertaining to the intermediary part of a Mach-Zehnder coupling between the two couplers at 3 dB. A provision is made for the modulation of the light signal transmitted by either of the two fibres.

According to another characteristic, the two fibres are sectioned off in such a way as to have the two ends on one side and the other side of the cell, with the walls of the said cell containing a blind hole opposite each end, these ends being fitted in the blind holes in front of a command electrode.

FIG. 3 which represents a diagram showing the orientation of the two neutral axes of an SSFLC cell used in the embodiments of the invention. Assume of an incident rectilinear polarisation Pi, oriented in accordance with Pv. In determining the references for the horizontal rectilinear polarisation Ph and vertical polarisation Pv, the Kones matrix of an SSPLC liquid crystal is, in general:

According to another characteristic, the fibre is a multi-core fibre, with two or four cores, which form two pairs of individual fibres.

According to another characteristic the multi-core fibre is sectioned off in order to form two multi-core fibres which are arranged on one side and the other of the said cell, in such a way that their cores are aligned. The walls of the cell containing a blind hole opposite the end of each multi-core fibre, which is fitted in the blind hole in front of a multiplicity of command electrodes.

According to another characteristic, the multi-core fibre is a four-core fibre which is sectioned off in front of the cell. The upstream wall of the cell contains a blind hole opposite the end of the multi-core fibre. On the downstream wall of the cell, a guiding layer is provided which transmits respectively the optical signals deriving from two of the four cores. The optical signals are modulated while crossing the cell to the two others of the four cores of the multi-core fibre.

According to another characteristic, the multi-core fibre is a four-core fibre which is sectioned off a little in front of the cell, of which the upstream well contains, opposite each core, a micro-optical collimation element. The downstream wall of the cell is adjacent to the large face of a total reflection prism. The optical signals deriving from two of the four cores is returned to the two other cores respectively.

BRIEF DESCRIPTION OF THE DRAWINGS

The characteristics of the present invention referred to above, as well as others, can be appraised more clearly by reading the following description of various embodiments, and the description relating to the appended drawings, of which.

DETAILED DESCRIPTION OF THE INVENTION

Figure 4:
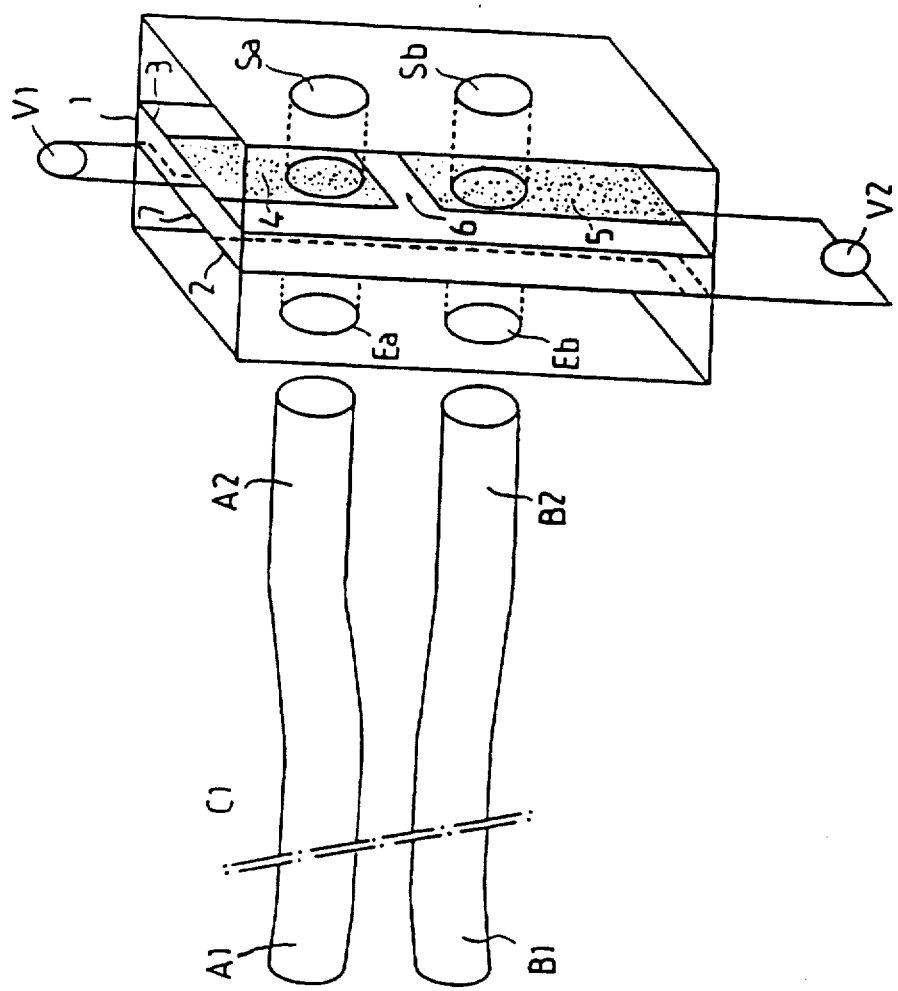
FIG. 4 is a schematic view, partially exploded, of a first embodiment of an electro-optical phase modulator of a Mach-Zehnder coupler according to the invention.

In greater detail, FIG. 4 shows in schematic form a Mach-Zehnder coupler comprising two optical fibres A1 and B 1, entering a first coupler C1, of the traditional 3 dB type, from which two optical fibres or guides A2 and B2 emerge, which are connected to the inputs Ea and Eb of an SSFLC liquid crystal cell 1. Connected at the outputs Sa and Sb of the cell 1 are two optical fibres or guides A3 and B3, which enter a second coupler C2, of the traditional 3 dB type, from which two optical fibres A4 and B4 emerge.

The cell 1 is delimited by parallel side walls 2 and 3, which are oriented perpendicular to the optical axes of the guides A2 and B2, and which define the thickness of the cell, which is selected as equal to a half-wave, i.e. half of the operating wavelength. In the longitudinal directions, the cell 1 is delimited by the traditional known means. The material of the walls 2 and 3 is traditional transparent isotropic glass.

Opposite the guides A2 and B2, and opposite the guides A3 and A4, blind holes Ea, Eb, Sa and Sb are drilled respectively in the transparent walls 2 and 3, in such a way as to form the inputs Ea and Eb and the outputs Sa and Sb. These blind holes allow the ends of the two fibres to be located as close as possible to the liquid crystal, and therefore for coupling losses between the fibres or the guides and the cell 1 to be reduced to a minimum.

The inside face of the wall 2 is partially covered, on the side of the holes Sa and Sb, by two electrodes 4 and 5, in the form of vertical conductive plates which are thin enough to be transparent to the light emerging from the cell 1. The use and manufacture of such thin conductive layers is traditional in the art. The electrodes 4 and 5 have a horizontal insulating gap 6 between them.

The inside face of the wall 1 is partially covered by a thin vertical conductive plate 7, over its entire height.

The electrodes 4 and 5 are electrically connected respectively to the first terminals of two voltage sources V1 and V2. The electrode 7 is connected to the second terminals of the sources V1 and V2. The electrode 7 is a common counter-electrode in relation to the electrodes 4 and 5, which are controlled selectively.

The electrodes 4, 5, and 7 se transparent, the electrode 4 covering the area of the base of the blind hole Sa and the surrounding area, the electrode 5 covering the area of the base of the blind hole Sb and the surrounding area, and the electrode 7 covering simultaneously the areas of the bases of the blind hole Ea and the blind hole Eb, as well as their surrounding areas. The gap 6 between the electrodes 4 and 5 is normally oriented towards the optical guides A3 and B3, and serves to insulate the electrodes 4 and 5 electrically, and to separate physically their areas of influence in the liquid crystal of the cell 1.

Figure 1:
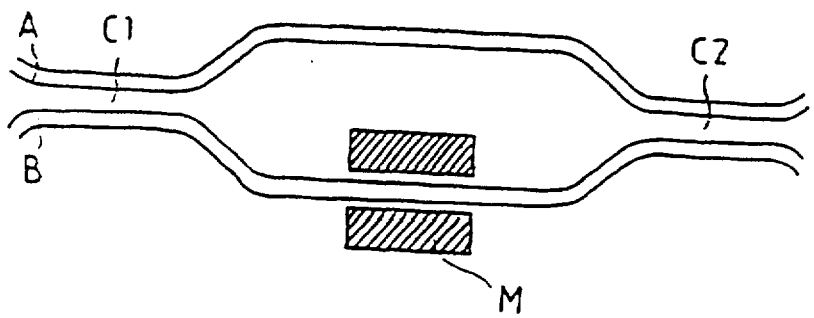
FIG. 1 shows in schematic form the structure of a Mach-Zehnder directional coupler, such as is known from the state of the art.
Figure 2:
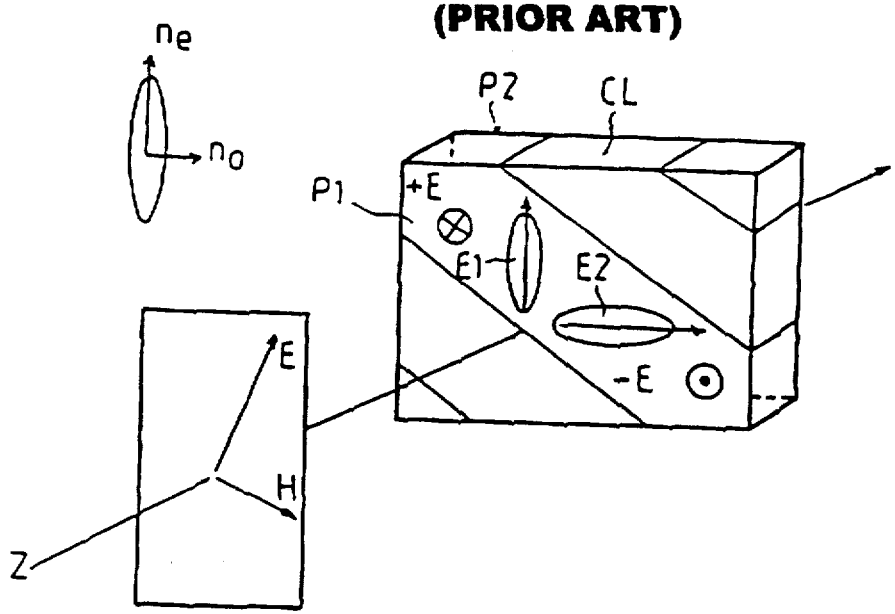
FIG. 2 is a schematic view illustrating the known principle of operation of an SSFLC liquid crystal cell.
Figure 3:
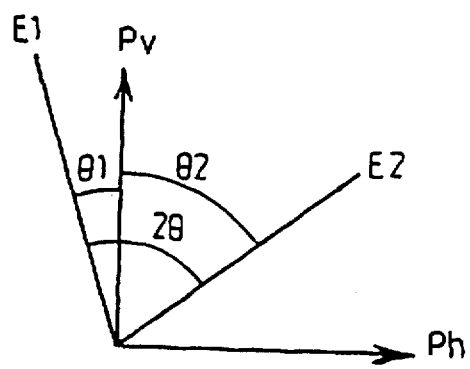
FIG. 3 is a vectorial diagram illustrating the behaviour of the SSFLC liquid crystal cell from FIG. 2 when it is provided with a wide tilt angle, close to 45°.

It should be noted that, in relation to the coupler M of FIG. 1, the embodiment from FIG. 4 comprises two electro-optical phase modulators instead of one modulator M. The configuration of FIG. 4 naturally balances the phase displacements of the two transmission paths by optical guides A2–A3 and B2–B3. This is an interferometers structure and a device completely insensitive to polarisation. Each of the channels can be controlled separately, thanks to the separation of the electrodes 4 and 5 in relation to their common counter-electrode 7.

In addition to this, the device can be very compact, and no inhomogeneity is to be feared from the point of view of the liquid crystal, inasmuch as the two channels use the same cell. The function of the Mach-Zehnder interferometric coupler of FIG. 4 is as follows. At the output of the coupler C 1, in the fibre B2, the light wave is in a leading phase of $\pi/2$. If the voltage sources V1 and V2 are applied, in the guide B3, the light wave will be in a leading phase of $\pi/2$. A at the output of the coupler C2, the fibre B4 will transmit the entire light wave. If the voltage sources V1 and V2 are applied the guide A3, the light wave will have a phase lag of $\pi/2$ and, at the output of the coupler C2, the fibre A4 will transmit the entire light wave.

Figure 5:
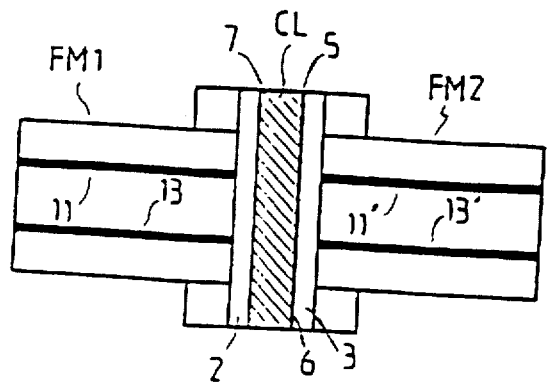
FIG. 5 is a schematic view, in longitudinal section, of second embodiment according to the invention.

FIG. 5 represents in schematic form, in a longitudinal section, a second embodiment.

The function of the interferometric coupler in FIG. 4 presupposes a very strict balance between the arms of the interferometer, i.e. an extremely precise check on the length of the fibres A2–A3 and B2–B3. Satisfying such a requirement may appear difficult to reconcile with the requirement to achieve an implementation at a low cost. In order to overcome this difficulty, it is proposed that use be made of a multi-core fibre to form the arms of the interferometer. As far as the multi-core fibres are concerned, reference may be made to the contents of document FR-A-2 701 571 (French Patent Application No. 93 01674, submitted on 15.2.93 and entitled "Multi-core optical guides of high precision and small dimensions, and a process for the manufacture of such guides").

In the embodiment of FIG. 5, use is made of a multi-core fibre containing four cores, such as is described in the technical article "Ultra high density cables using a new concept of bunched single mode fibres; a key for the future FTTH networks", by G. Le Noane et al., FWCS, Atlanta, November 1994.

Figure 6:
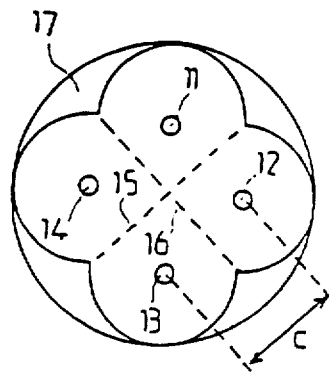
FIG. 6 is a transverse sectional view of a multi-core fibre with four cores, serving to illustrate the embodiment from FIG. 6.

FIG. 6 shows a transverse section of such a multi-core fibre, which corresponding to FIG. 1 of the article by G. Le Noane et al. referred to above. The fibre comprises four cores, 11, 12, 13, and 14, which are geometrically placed at the points of a square having a length of a side c, FIG. 6, which is 44.2 $\mu$m. Each core 11 to 14 is surrounded by a glass cover of which the lateral surface comprises a circular arc section of approximately 1800, extended by the half-plane of a rectangular dihedral, the sharp edge of which is common to the four cores. In FIG. 6, the projections of the four dihedrals are represented by straight segments 15 and 16, shown as dotted lines.

In practice, each core and its covering are manufactured on the basis of an elementary preform, of a suitable geometrical shape. The surface of the elementary preform is then polished in order to achieve greater precision; the four elementary preforms are assembled and form the fibre as shown in FIG. 6. Finally, the four fibres are covered by a covering 17, for example a plastic covering of circular section and 125 $\mu$m in diameter.

FIG. 6 shows the cores 11 and 13 of an incoming multi-core fibre FM1, and the corresponding cores 11' and 13' of an outgoing multi-core fibre FM2, the analogues respectively of the incoming fibres A2 and B2 and the outgoing fibres A3 and B3 of the example in FIG. 4. As in FIG. 4, located between the fibres FM1 and FM2 is the liquid crystal cell CL, which is provided with transparent electrodes 5 to 7, and two transparent walls 2 and 3. These walls feature blind holes in order for the ends of the incoming cores of the fibre FM1 and outgoing cores of the fibre FM2 to be, respectively, as close as possible to the liquid crystal. The function of the device is the same as in FIG. 4, inasmuch as, in the multi-core fibres FM1 and FM2, only two of the four cores are used, or one multicore fibre with two cores.

The advantage of the device in FIG. 5 in relation to that of FIG. 4 is, as already mentioned, that it guarantees the equality of length of the arms 11 and 13, and the length of the arms 11' and 13'. In addition, the multi-core fibre ensures that the arms of the interferometer are integral, whatever the temperature may be, which makes it practically possible to ensure the insensitivity of the device to fluctuations in temperature. In addition to this, it is easier to ensure the alignment of multi-core fibres than of two independent fibres. The use of the standard connector is therefore possible, which reduces the complexity, and therefore also the cost.

In the preceding example, only two cores 11 and 13 have been used of the four cores that are available in a multi-core fibre from FIG. 6. However the two other cores 12 and 14 may be used in a second interferometer coupling according to the invention, using only one single liquid crystal cell, on the condition that two additional analogue electrodes are provided at 7 and 8, but offset by 90°. The implementing technological—polishing, deposition of ITO, the alignment layer, etc.—is identical to that already referred to, with the difference of the simplification applied with regard to the location of the fibres opposite one another, and their alignment.

It is clearly possible to use the second pair of cores independently of the first, for example in order to have two interferometers in parallel. The examples given above correspond to a configuration in transmission. However a configuration in reflection can also be conceived, particularly by using the principle of a multi-core fibre, with four cores. When a multi-core fibre is used, the transparent electrode can be located directly on the section of the multi-core fibre.

Figure 7:
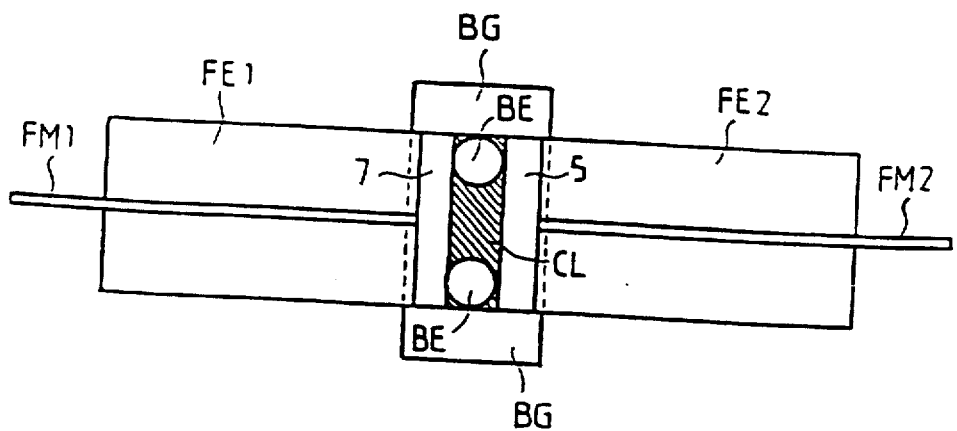
FIG. 7 is a schematic view, in a longitudinal section, of a variant of the embodiment from FIG. 5.

FIG. 7 shows a variant embodiment of the cell 1 from FIG. 5, to which are allocated the multi-core input fibre FM1 and returning the multi-core output fibre FM2,' which are located respectively in the ferrules FE1 and FE2, which, in this variant, play the part, inter alia, of the transparent walls 2 and 3 in FIG. 5. In this case, the end sections of the fibres FM1 and FM2, at least as far as the cores which are used are concerned, are polished. Then the ends are covered by depositing transparent electrodes analogous to the electrodes 5 to 7, on which are superimposed fine sheets of the alignment polymer.

These transparent electrodes also partially cover the installation holes for the fibres FM1 and FM2 in the ferrules FE1 and FE2, which implies that these installation holes can be regarded as blind holes as in the example of FIG. 5. Next, the two fibres FM1 and FM2 are located opposite each other. This procedure can be rendered secure by using a reference point formed by two perpendicular surfaces, as is described in the document FR-A-2 701 571, page 13, lines 8 to 19, and then fixed in position by a retaining ring BG. The spacing of 7 micrometers between the two ends of the fibres is ensured, in order to obtain a half-wave, by means of spacer beads of a diameter of 7 micrometers. Finally, the liquid crystal CL is introduced so as to occupy the free space between the ends, polished, and fitted with electrodes and multi-core fibres, by means of capillarity.

Figure 8:
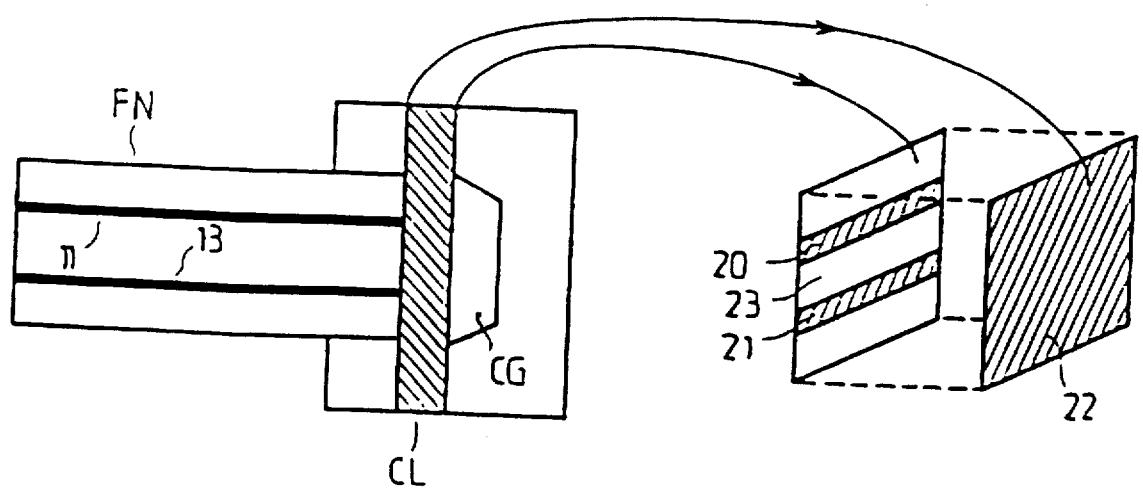
FIG. 8 is a schematic view, in longitudinal section, of a third embodiment according to the invention, operating in reflection.

FIG. 8 shows an embodiment of the configuration for transmission, but with aliasing of the light transmission.

As in the embodiment of FIG. 5, the device comprises, to the left of the liquid crystal cell CL when looking at the drawing, a multi-core fibre FN with four cores 11 to 14, as in FIG. 6, the liquid crystal cell CL, and, to the right of this, a guiding layer CG. The guiding layer CG functions by returning the light signal which emerges from the core 11, across the cell CL, to the input of the core 12 of the same fibre FN, and the light signal which emerges from the core 13, across the cell CL, to the input of the core 14 of the fibre FN, and allows for the divergence of the bundle outputting from the fibre. This is under the assumption that, at the level of the optical guides in the layer CG there are only weak interactions, such as limit dispersion, and, therefore, to limit injection losses in the second pair of cores.

As shown in schematic form in FIG. 8, the electrodes associated with the cell CL are the horizontal electrodes 20 and 21, which are respectively opposite the areas of the cores 11 and 13, and the counter-electrode 22, opposite the areas of cores 11 to 14. It the same way as the electrodes 4 and 5, the electrodes 20 and 21 can be connected selectively to the first terminals of the voltage sources V1 or V2, while the electrode 22 is connected to the second common terminals of these sources. An insulating strip 23 is provided between the parallel transparent strips which form the electrodes 20 and 21.

The function of the example shown in FIG. 8 is practically the same as that of the example in FIG. 6, taking into account the fact that, opposite the areas of the cores 12 to 14, there are no selective command electrodes (this is the strip 23); i.e. the cell CL does not incur any phase displacement. In conclusion, the optical path is aliased by the guiding layer CG.

The embodiment in FIG. 8 provides an evident improvement in compactness in relation to the other embodiments. This presupposes that the information deriving from one pair of cores is then reinjected into the second pair of cores, while applying the required phase modulation to the path.

Figure 9:
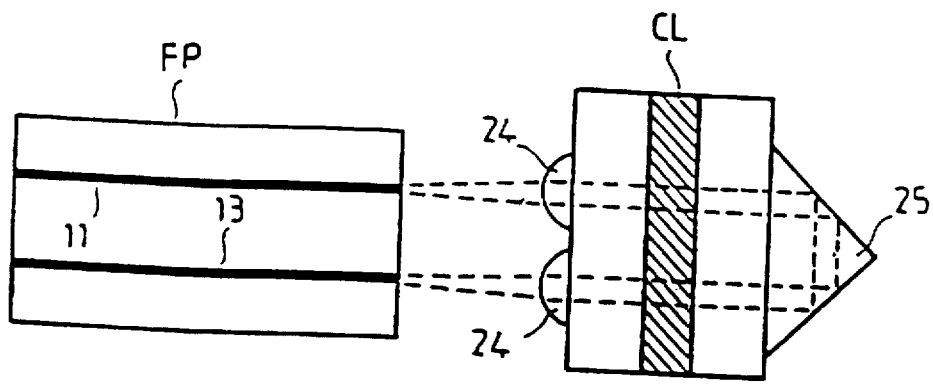
FIG. 9 is a variant of the device from FIG. 8.

FIG. 9 again shows an embodiment of a configuration with aliasing, but in which use is made of bundle collimation micro-optics and a mirror, which ensures the aliasing effect.

The device to the left of the drawing comprises a multi-core fibre FP with four cores 11 to 14, as In FIG. 6, the fibre FP being sectioned off transversely in front of a cell CL, which is provided with, opposite each core 11 to 14 respectively, a micro-optic collimation device 24. Behind the cell CL, i.e. to the right when looking at the drawing, a total reflection prism 25 is provided which serves as a mirror to reflect the light signals deriving respectively from the cores 11 and 12 towards the cores 13 and 14 of the fibre FP.

One particular constraint in this case is the maintaining of relative polarisation between the paths. This can be achieved by using dielectric mirrors under the Brewster condition, or a total reflection prism operating under the same conditions. In the context of a multi-core fibre, and taking account of the orders of magnitude (focal and diameter of the microlenses), in order to guarantee good paralleity of the bundle between the two collimation microlenses, the optical path between the lenses should not exceed 1 mm.

This type of solution guarantees a good connection balance, but requires the positioning of the fibre in relation to the collimation micro-optics; i.e. the positioning of the four cores at the focal point of the four microlenses 24, which necessarily imposes a degree of tolerance for the focal length.

We claim:

1. An electro-optical phase modulator for single mode optical fibres comprising a smectic chiral ferroelectric C* liquid crystal cell (CL) adapted to be crossed by a light signal which is transmitted via an optical fibre, the cell (CL)

having transparent walls and transparent command electrodes (5 to 7), the liquid crystal (CL) being used in a half-wave mode as a SSFLC (surface stabilized ferroelectric liquid crystal) type, the cell having a wide tile angle which is substantially 45° to make said modulator insensitive to polarisation, and two parallel optical fibres, said modulator being connected to said two parallel fibers (A2, A3; B2, B3) as an intermediate part of a Mach-Zehnder coupling between two couplers at 3 dB, and means for modulating a light signal transmitted by either of the two fibers.

2. An electro-optical phase modulator according to claim 1 further comprising and an optical fibre which is a multi-core fibre (FM1, FM2) with at least two cores, which form two pairs of individual fibres.

3. An electro-optical phase modulator according to claim 2, wherein said cell has at least two sides and the multicore fibre is sectioned off in order to form two multi-core fibres (FM1 and FM2), which are arranged on one of said sides of said cell and the other of said sides of the said cell (CL), each of said sides containing a blind holes opposite the end of each multi-core fibre, and said fibres being fitted in the blind hole in front of a multiplicity of command electrodes.

4. An electro-optical phase modulator according to claim 2, wherein the multicore fibre (FN) has four-core fibres which are sectioned off in front of the cell (CL), said cell having an upstream wall which contains a blind hole opposite each of the ends of the multi-core fibre, and said cell having a downstream wall, a guiding layer (CG) on said cell, which transmits optical signals derived from two of the four cores and which are modulated while crossing the cell, in order to return them unaltered across the cell (CL) toward the other two of the four cores of the multi-core fibre (FN).

5. An electro-optical phase modulator according to claim 2, wherein said multi-core fibre (FN) has a four-core fibre, said fibre being sectioned off slightly in front of the cell (CL), the cell having an upstream wall containing a collimation micro-optical element (24) opposite each core, and the upstream wall being adjacent a large face of a total reflection prism (25), the optical signals derived from two of the four cores being returned respectively towards the two other cores.

6. An electro-optical phase modulator according to claim 1, wherein said cell has at least two sides, and two parallel optical fibres (A2, A3; B2, B3) which are sectioned off to have ends of the two optical fibres on one of said sides of said cell and the other of said sides of said cell, the cells having walls (2, 3) comprising a blind hole (Ea, Eb, Sa, Sb) opposite each of said ends of said fibres, the ends being fitted into the blind hole in front of a command electrode (5 to 7).

* * * * *